June 24, 1924.  
E. COCCHI ET AL  
BALANCE  
Filed July 22, 1921  
1,498,952  
2 Sheets-Sheet 2

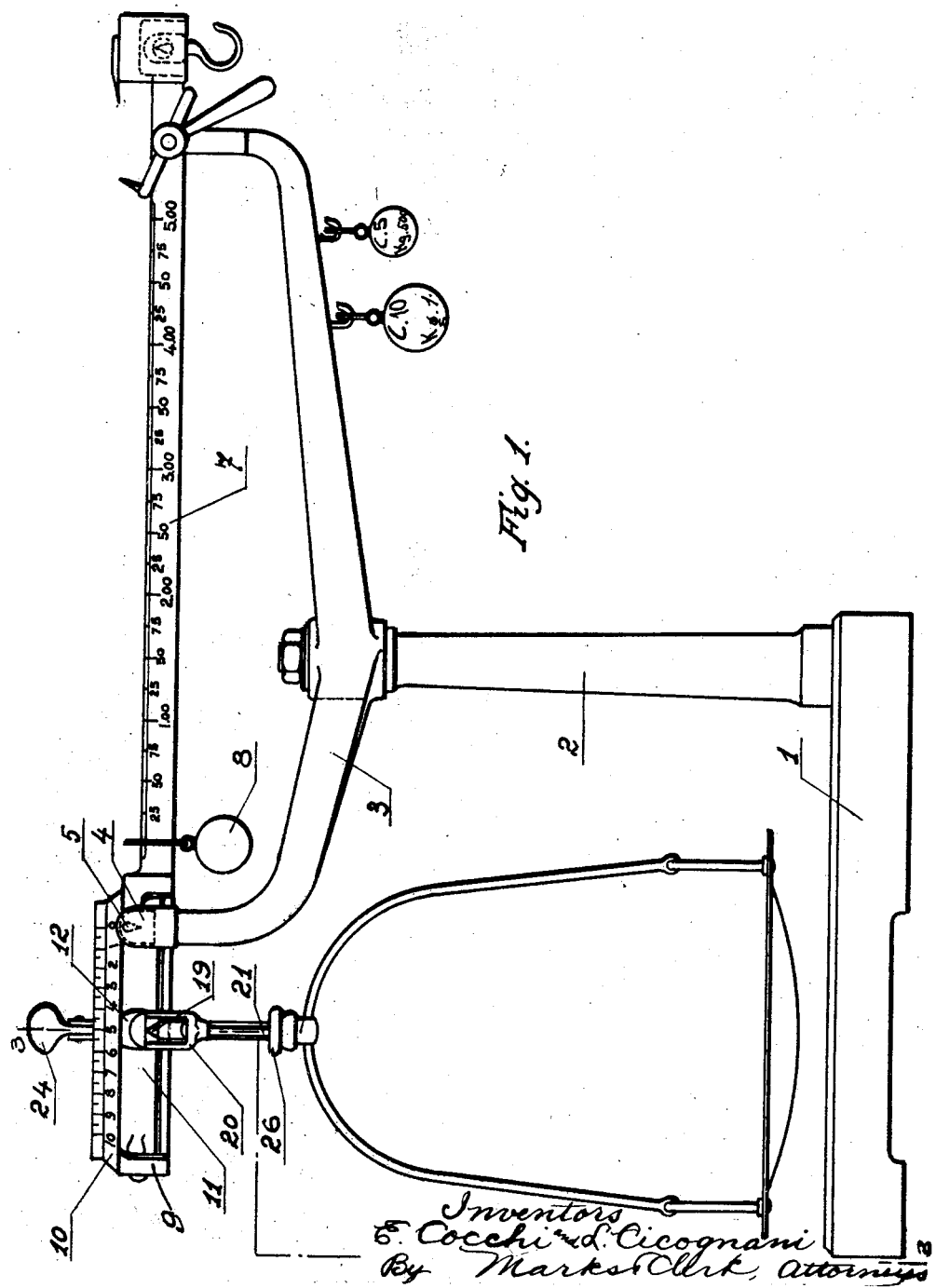

Inventors
E. Cocchi
L. Cicognani
By Marks Clerk
Attorneys.

Patented June 24, 1924.

1,498,952

UNITED STATES PATENT OFFICE.

ERNESTO COCCHI AND LINCEO CICOGNANI, OF BENTIVOGLIO, BOLOGNA, ITALY.

BALANCE.

Application filed July 22, 1921. Serial No. 486,799.

*To all whom it may concern:*

Be it known that we, ERNESTO COCCHI and LINCEO CICOGNANI, subjects of the King of Italy, residing at Bentivoglio, Bologna, Italy, have invented certain new and useful Improvements in Balances, of which the following is a specification.

The subject matter of the present invention is a balance in which a double armed swinging lever carries on one side a sliding weight and on the other side the balance scale.

The novel basic idea in the invention is that the suspension point for the scale on the lever arm is movable, the equilibrium of the balance being obtained by utilizing the angular movements of the scale about a vertical axis.

The annexed drawing shows one execution form of the novel balance by way of example.

In the drawing:

Fig. 1 is a side view.

Figure 3:
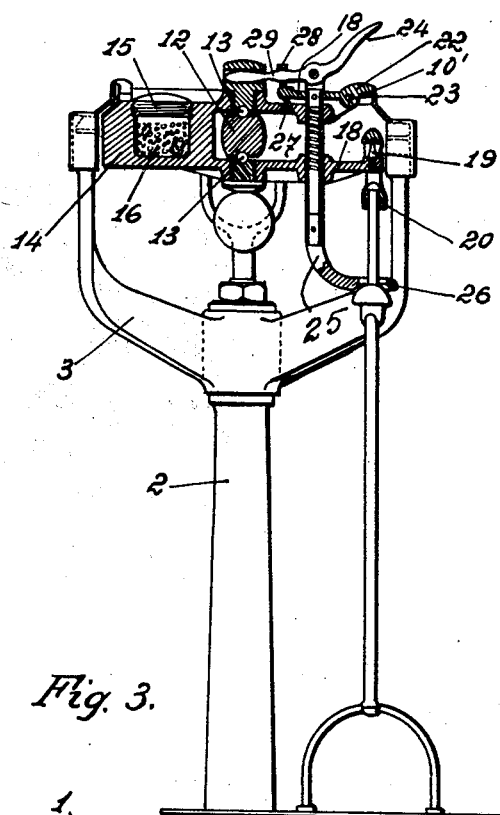
Fig. 3 is a section through 3—3 in Fig. 1.
Figure 2:
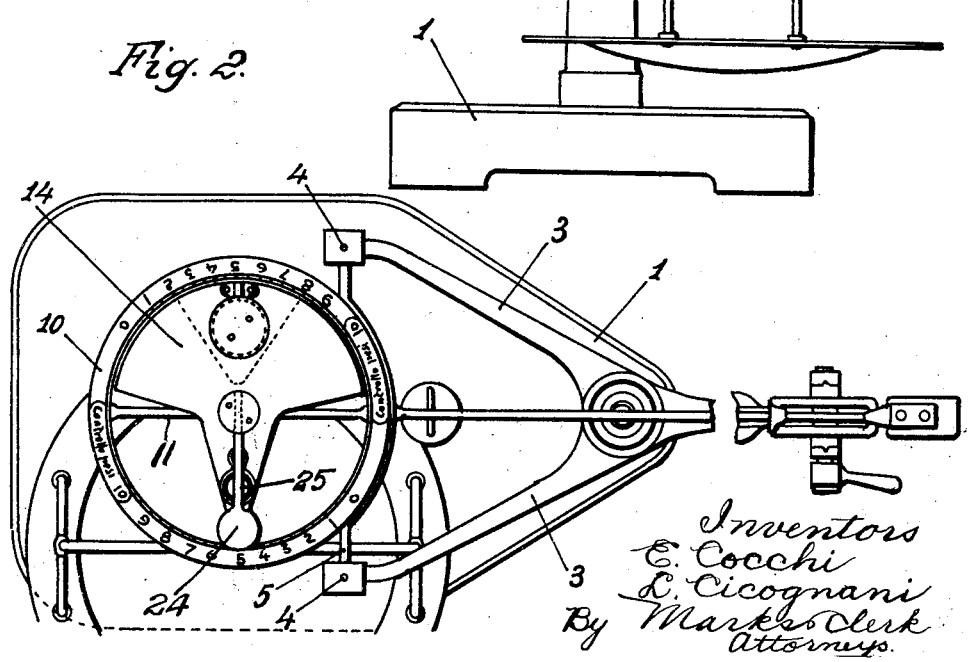
Fig. 2 is a plan.

On the base plate —1— is arranged the standard —2— fitted with arms —3— whose ends carry the spindle of the balance steelyard.

The steel-yard arm —7— is straight, as usual, and carries the sliding weight —8—, whereas the steel-yard arm —9— is circular and consists in a ring —10— fitted with a diametral crossbar —11— in whose center a bearing —12— with balls —13— is provided for a revolving frame.

The frame just mentioned comprises a metal sector —14— in which is formed a receptacle —16— intended to receive a suitable ballast; —15— is a threaded plug for the said receptacle, —18— and —18′— are two arms projecting from the sector —14—. At the end of arm —18′— a pin —19— is provided to receive the fork —20—; this fork is connected to the frame —21— carrying the scale pan.

To the arm —18— a pointer —22— is secured, the pointer being carried by the spindle —23— and its point revolving over the edge of the dial —10—. For the circular movement of the revolving frame a handle —24— is provided at the upper end of the stirrup —25—.

The stirrup —25— is arranged vertically across the arms —18—18′— and its lower end is bent and forms an eyelet —26— encircling the upper rod of the frame —21—.

—27— is a spring holding the pointer —22— in contact with the edge of the dial —10—; —28— is a screw fitted to the extension —29— of the handle —24— in order to adjust the tension of the spring —27—. The steel-yard arm —7— and the dial —10— are fitted with a scale each. The divisions of the scale engraved on —10— indicate the price units of the goods that are to be weighed.

The scale —7— indicates the multiples of the said units; on the other side of the steel-yard arm are engraved the weight divisions corresponding to the prices.

The novel balance is used in the following manner:

The balance is in equilibrium conditions when the weights —8— and the pointer —22— are on the zero of the respective scales.

If it now be desired to weigh any given article whose unit price is —*a*— and to weigh out an amount whose total cost be —A—, the pointer —22— should be brought over the division —*a*— of the scale —10— and the weight —8— over the division —A— of the scale —7—. Such a quantity of the article concerned should be then placed on the balance scale as will restore equilibrium.

Claims:

1. A weighing machine including an elongated yard arm having a circular portion formed at one terminal thereof and pivotally supported adjacent said terminal, a frame revolubly mounted on the circular portion and a scale pan suspended from the frame and apt to be displaced along the frame for altering the effective length of the long portion of said arm.

2. A weighing machine as claimed in claim 1 wherein a cross-bar is arranged on the circular portion, a ball bearing fitted in said cross-bar for supporting the frame, and means on the frame for coacting with the point of suspension of the scale pan when unloaded for maintaining the weighing machine in equilibrium.

3. A weighing machine including a base, a standard rising therefrom, forked arms projecting from the standard, a steel-yard arm having a main straight portion and a circular portion at one terminal of the straight portion and pivoted between the forked arms at a point adjacent the circular portion, a cross-bar fitted in the circular portion, a ball bearing in the cross bar, a frame revolubly mounted on the bearing and including spaced arms, a pin on one of said arms, a forked bearing on the pin, a scale pan suspended from the forked bearing, a ballast receptacle arranged in the frame opposite the point of suspension of the scale pan, a spring pressed pointer mounted on the frame and a stirrup mounted in the frame and having a portion embracing the scale pan and a handle pivotally mounted on the stirrup for coacting with the pointer and the frame for facilitating adjustment of the pointer and the frame.

ERNESTO COCCHI.
LINCEO CICOGNANI.